Figure 1:
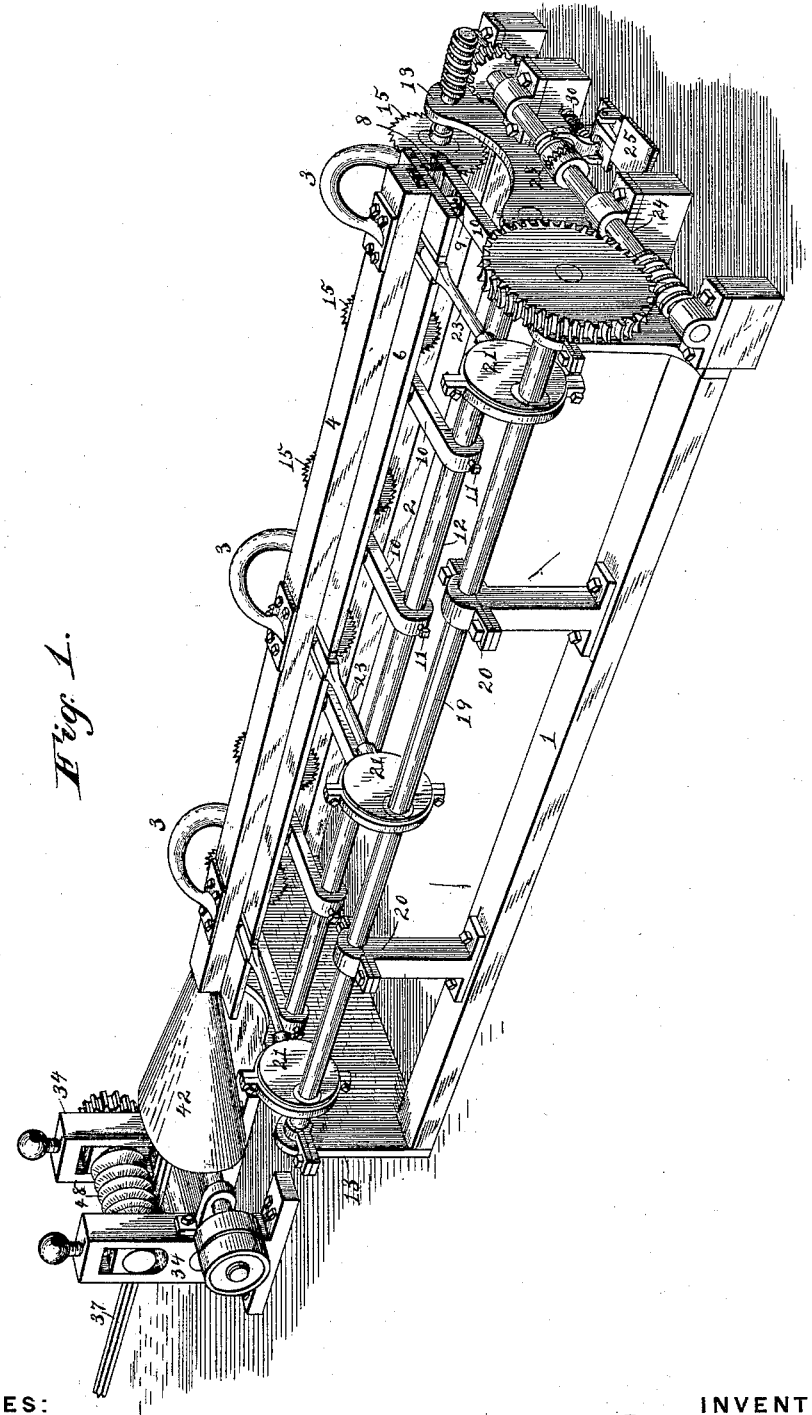

(No Model.) 5 Sheets—Sheet 1.
E. FIRTH.
HORSESHOE BLANK CUTTING MACHINE.

No. 408,226. Patented Aug. 6, 1889.

WITNESSES:
Arthur L. Bryant
William C. Belt

INVENTOR
Edwin Firth
By Edson Bros,
Attorneys (No Model.) 5 Sheets—Sheet 3.
E. FIRTH.
HORSESHOE BLANK CUTTING MACHINE.

No. 408,226. Patented Aug. 6, 1889.

WITNESSES:
Arthur L Bryant
William O Belt

INVENTOR
Edwin Firth
By Edson Bros
Attorneys (No Model.)  5 Sheets—Sheet 4.

E. FIRTH.
HORSESHOE BLANK CUTTING MACHINE.

No. 408,226. Patented Aug. 6, 1889.

WITNESSES:
Percy C. Bowen
A. Lewis Bowen

INVENTOR
Edwin Firth
By Edson Bros.
Attorneys (No Model.) 5 Sheets—Sheet 5.

E. FIRTH.
HORSESHOE BLANK CUTTING MACHINE.

No. 408,226. Patented Aug. 6, 1889.

WITNESSES:
Arthur L. Bryant
William O. Belt

INVENTOR
Edwin Firth
By Edson Bros,
Attorneys

UNITED STATES PATENT OFFICE.

EDWIN FIRTH, OF TROY, NEW YORK.

HORSESHOE-BLANK-CUTTING MACHINE.

SPECIFICATION forming part of Letters Patent No. 408,226, dated August 6, 1889.

Application filed November 24, 1888. Serial No. 291,787. (No model.)

*To all whom it may concern:*

Be it known that I, EDWARD FIRTH, a citizen of the United States, residing at Troy, in the county of Rensselaer and State of New York, have invented certain new and useful Improvements in Horseshoe-Blank-Cutting Machines; and I do hereby declare the following to be a full, clear, and exact description of the invention, such as will enable others skilled in the art to which it appertains to make and use the same.

This invention relates to machines for cutting horseshoe-blanks, which will be hereinafter fully described and claimed.

Heretofore in the manufacture of horseshoe-blanks it has been customary to cut a bar of metal of suitable length longitudinally into two parts and then transversely into suitable lengths, these cuts being performed manually by suitable shears; but this method is objectionable not only because of the time, labor, and expense involved, but the edges of the bar, after it has been severed longitudinally, and the ends of the blanks are rough, uneven, and ragged.

My invention has for its object to overcome these objections and to expeditiously and economically split the long bar of metal longitudinally and cut the same transversely into blanks of suitable length while the bar is in the machine, and thereby produce a number of blanks at one operation which have straight smooth-finished edges and square smooth or even ends, which in this art is highly desirable.

With these ends in view my invention contemplates, first, a set of coacting rolls constructed to form a longitudinal groove or crease in the middle of a bar of metal and a rotatable saw arranged at one side of said rolls and in the path traversed by the bar of metal to split or sever the latter longitudinally through the middle of the crease or groove.

My invention further contemplates the combination of the set of coacting creasing-rolls, a rotatable saw for splitting the bar longitudinally after it passes the rolls, a receptacle into which the split bar is received, one or more saws arranged in a vertical plane at right angles to said receptacle, and mechanism for feeding said split bar to the latter saw or saws, whereby the split bar is cut transversely into a series of blanks of suitable length.

My invention further contemplates a novel mechanism for moving the longitudinally-split bar from the receptacle to the crosscut-saws, which mechanism is under the control of the attendant; and it consists, essentially, of a laterally-movable bottom to the receptacle which is adapted to be withdrawn from beneath the receptacle, and thus permit the longitudinally-split bar to fall by gravity on suitable supports beneath the receptacle, this laterally-movable bottom having means for forcing the split-bar against the crosscut-saws, as will be hereinafter more fully described.

My invention further contemplates making the crosscut-saws and the supports for the split bar adjustable longitudinally on their respective shafts or arbors to adapt the saws for cutting the split bar transversely into blanks of any desired length; and my invention further consists in the several combinations of devices and novel construction and arrangement of parts, as hereinafter more fully pointed out in the claims.

To enable others to understand my invention, I will now proceed to describe the same, in connection with the accompanying drawings, in which—

Figure 2:
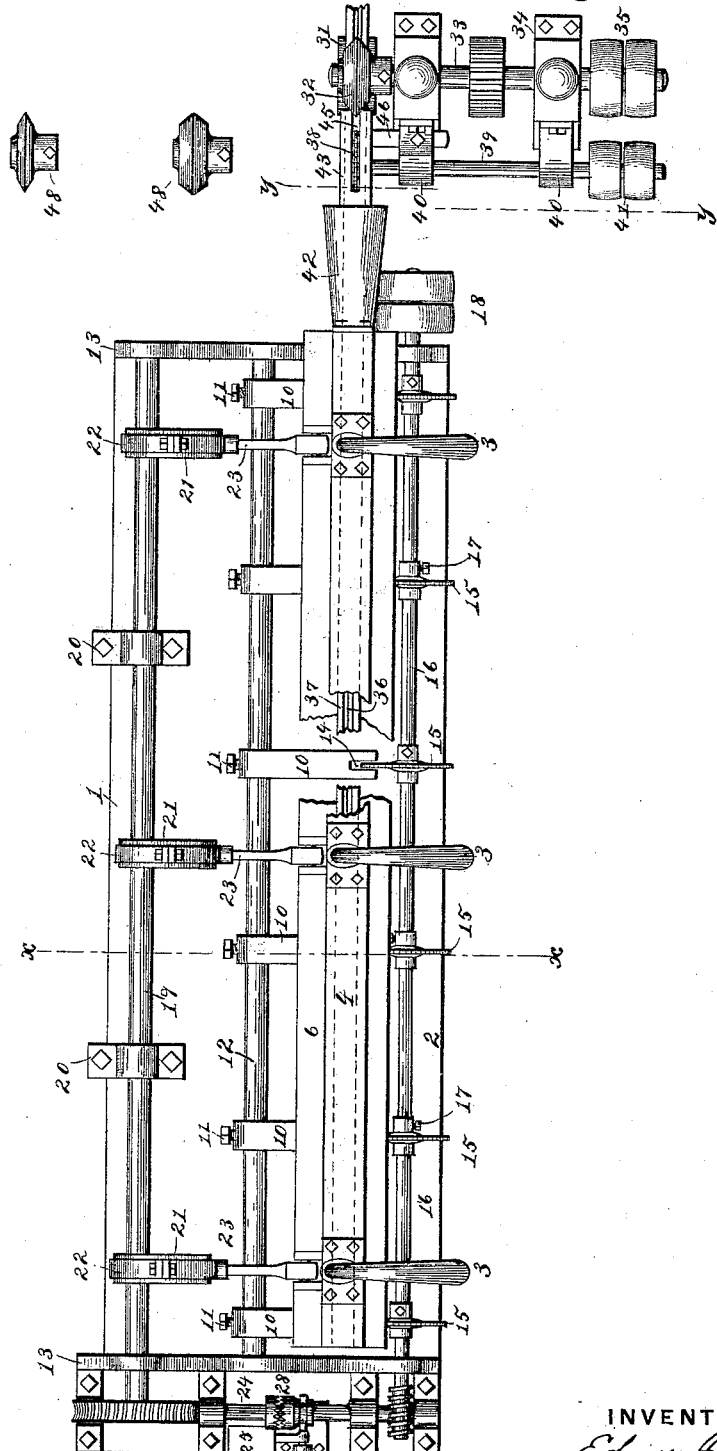
Figure 3:
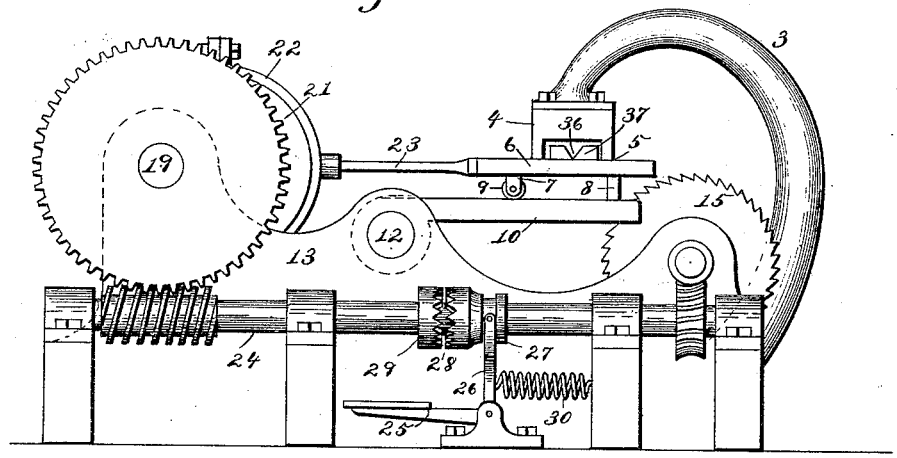
Figure 9:
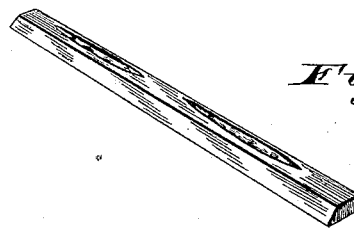
Figure 4:
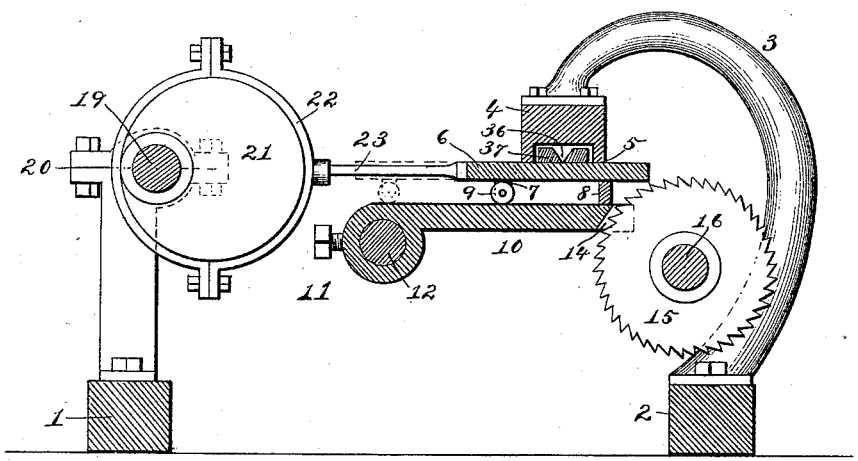
Figure 5:
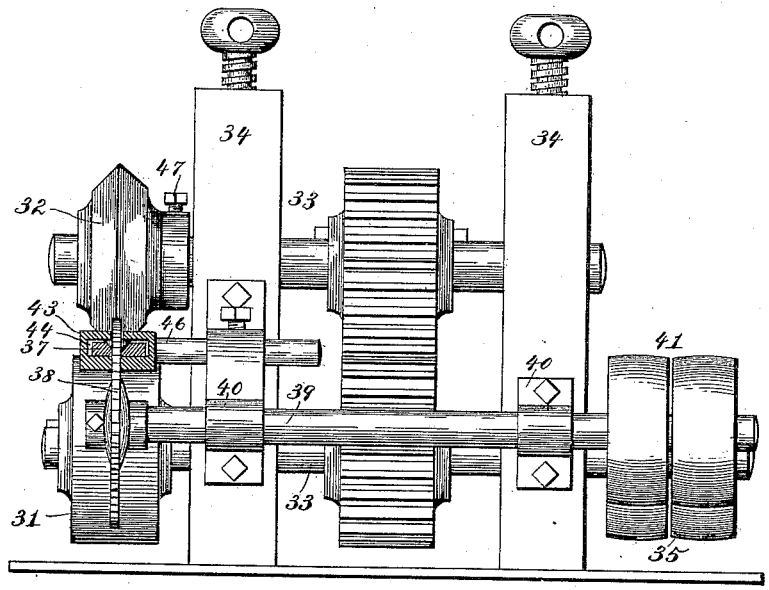
Figure 6:
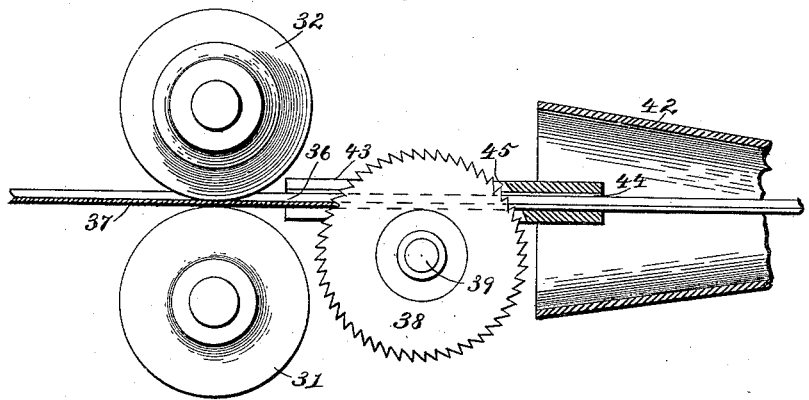
Figure 7:
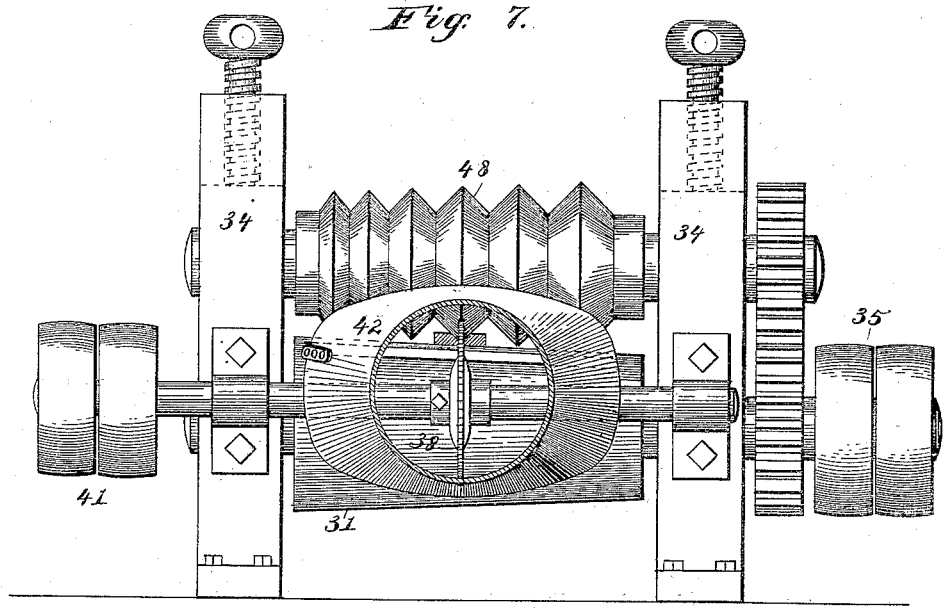
Figure 8:
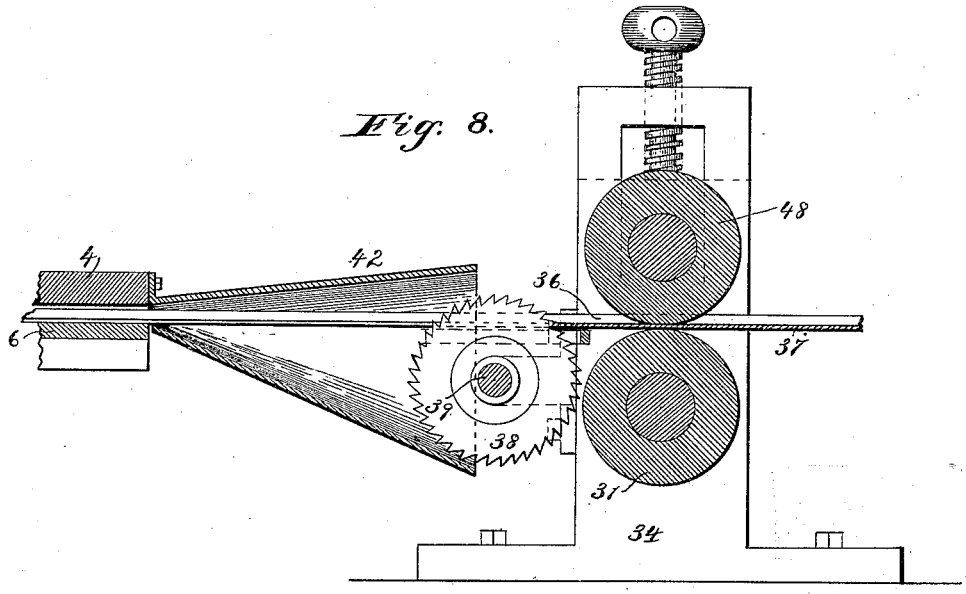

Figure 1 is a perspective view of my machine for cutting horseshoe-blanks. Fig. 2 is a top plan view thereof, partly broken away. Fig. 3 is an elevation taken from one end of the machine. Fig. 4 is a vertical transverse sectional view on the line $x\ x$ of Fig. 2. Fig. 5 is a vertical transverse sectional view on the line $y\ y$ of Fig. 2, showing my preferred form of creasing-rolls in side elevation and on an enlarged scale. Fig. 6 is an enlarged detail view of the set of creasing or grooving rolls, the saw for splitting the metallic bar longitudinally, and the guides for directing said metallic bar into the receptacle or box for said bar. Figs. 7 and 8 are views corresponding, respectively, to Figs. 5 and 6, showing a modification of the set of creasing-rolls contemplated by my invention. Fig. 9 is a detail perspective view of one of the horseshoe-blanks cut by my machine.

Like numerals of reference denote corresponding parts in all the figures of the drawings.

1 2 designate a pair of horizontal longitudinal sills, which are arranged parallel with each other and extend the entire length of the machine, and to one of these sills 2 is secured a series of vertical curved standards 3, which carry or support a horizontal receptacle or box 4, which receives the bar of metal after it has been grooved or creased and split or divided longitudinally, as presently fully explained, the upper extremities of these fixed standards 3 being curved, as shown in Figs. 1, 3, and 4, and the receptacle or box being firmly bolted to the free ends of the curved standards, so as to be suspended a suitable distance above the ground in a very secure manner. This receptacle or box is preferably rectangular in cross-section and is open at its lower side, as indicated at 5 in Figs. 3 and 4, and it is normally closed by a laterally-movable bottom 6, which operates or slides against the lower open side of the receptacle. This movable bottom extends the entire length of the receptacle, and is preferably made wider than the latter, and on its under side the bottom has two longitudinal parallel strips 7 and 8, which are rigidly fixed thereto and spaced or separated a short distance from each other, the inner strip 7 being provided with a series of rollers 9, which are suitably journaled so as to rotate or turn freely on their axes. The rollers of the strip 7 and the strip 8 ride on a series of horizontal supports 10, which are separated at suitable intervals and located below the receptacle or box and at right angles thereto, one end of each support being fixed by means of a set-screw 11 to a rigid bar or rod 12, which is supported at its ends in vertical end pieces 13 of the frame of the machine. These horizontal supports are movable or adjustable longitudinally on the supporting bar or rod 12 thereof, for a purpose hereinafter explained, and the free end of each support is extended beneath the receptacle or box, said free end of each support of the series being provided with an open longitudinal slot 14, in which works one of a series of revoluble crosscut-saws 15, the periphery or teeth of the saw entering the slot, as indicated very clearly in Fig. 4 of the drawings.

The crosscut-saws 15 are fixed to an arbor or shaft 16 by means of set-screws 17, which arbor or shaft is arranged longitudinally of the machine at one side of and below the receptacle, and is journaled in suitable bearings on the end pieces 13 of the frame of the machine, one end of said shaft being extended through the bearing provided therefor, and provided with a belt-pulley 18, by means of which power through a belt may be transmitted to the saw-arbor. These saws are spaced at suitable intervals on the continuous arbor or shaft, and the saws correspond in number to the supports 10, one saw being provided for each support and arranged in line therewith, the periphery or teeth of the saw being fitted in the open slot in the free end of the corresponding support. The saws are movable or adjustable longitudinally on the arbor or shaft 16, to adapt them for cutting the split bar transversely into blanks of suitable length, and when one or more saws are adjusted the corresponding support or supports 10 are likewise adjusted on the bar or rod 12, to cause each support to occupy the same relative position to its saw.

In addition to forming the means for upholding the laterally-movable bottom 6 of the open-side receptacle or box, these horizontal fixed supports 10 serve to support the longitudinally-split bar of metal, which drops or falls by gravity through the open lower side of the receptacle or box 4 when the bottom 6 thereof moves away from the receptacle, said split bar resting on the entire series of supports in proper juxtaposition to the series of crosscut-saws, to be cut transversely by the latter into blanks of suitable length. The proper feeding or adjustment of the split bar is performed by the outer rib or flange 8 of the movable bottom 6, in the path of which flange the bar is arranged, and as the movable bottom is positively returned to its normal position beneath the open lower side of the receptacle or box this continuous flange or rib 8 moves the split bar laterally on the supports 10 to the saws 15, which cut through the bar at right angles and sever it into a series of blanks of the proper lengths. The mechanism by which this lateral reciprocating movement of the bottom 6 is accomplished is as follows:

A shaft 19 is arranged longitudinally of the machine at the opposite side of the receptacle or box from the saw arbor or shaft 16, and is journaled in suitable bearings on vertical standards 20, which are fixed to the sill 1 of the frame. On this rotary shaft 19 is secured a series of eccentrics 21, each having an eccentric strap or yoke 22, which is connected by an intermediate pitman 23 with the laterally movable or reciprocating bottom 6, and it is obvious that when this shaft is rotated the bottom 6 is moved back and forth beneath the receptacle to alternately open and close the lower side thereof.

The rotary eccentric shaft 19 is driven by an intermediate or counter shaft 24, which is arranged transversely across one end of the machine, and is geared at its ends with the saw arbor or shaft 16 and the rotary eccentric-shaft 19, as clearly shown in Figs. 1, 2, and 3. The rotary eccentric-shaft 19 and the laterally-reciprocating bottom 6 can be stopped or started at the will of the attendant by simply moving a treadle 25, which is connected by a pitman 26 with the sliding section 27 of a clutch 28, the sliding section 27 of the clutch being fitted on one section of the counter-shaft 24, which is in gear at all times with the saw-arbor, while the other section 29 of the clutch is carried by another section of the counter-shaft 24, which is geared with the rotary eccentric-shaft 19. By depressing the treadle the clutch-sections are engaged and the counter-shaft transmits motion to the eccentric-shaft 19 from the saw-arbor to reciprocate the movable bottom 6 back and forth; but when the foot is removed from the treadle a spring 30 automatically uncouples the clutch-sections, and thus stops the eccentric-shaft and movable bottom 6.

I will now proceed to describe my mechanism for splitting or severing the bar of metal longitudinally into two equal parts or sections. This mechanism is located at one end of the machine, at the opposite end thereof from the counter-shaft 24; and it consists, first, of a set of grooving or creasing rolls, and, secondly, of a rapidly-rotatable saw arranged at one side of said rolls, between the latter and the receptacle 4, for cutting the bar of metal longitudinally as it emerges from the rolls and before its entrance into the receptacle or box.

My preferred form of set of creasing-rolls, which I will first proceed to describe, is illustrated in Figs. 2, 5, and 6, and this set of rolls consists of a lower smooth plain roll 31 and an upper roll 32, having a V-shaped periphery in cross-section. These rolls are carried by suitable arbors or shafts 33, which are journaled in suitable bearings on a frame 34, said roll-arbors being geared together, as shown in Fig. 5, and one of the arbors having a fast and loose pulley 35, by means of which the rolls can be positively driven. These creasing or grooving rolls 31 32 receive the bar of metal immediately after it emerges from the last pass of the ordinary forming or reducing rolls and while it is still hot, and said heated bar of metal is passed through and between the set of coacting rolls, a longitudinal groove or recess 36 being formed in the middle of the upper side of the bar 37 by the V-shaped upper roll 32 as said bar passes through the rolls, thereby reducing the thickness or width of the bar at the line where it is to be cut longitudinally and preparing said bar for the longitudinally cutting or ripping saw 38, which severs the bar longitudinally into two equal parts immediately after it passes said rolls. This rotatable saw 38 is situated immediately in front of the set of rolls, between the latter and the box or receptacle 4, and the saw is located in the same vertical plane as the apex of the V-shaped creasing-roll, and in the horizontal path traversed by the bar 37 on its way from the creasing-rolls to the box or receptacle, whereby said saw is adapted to sever the bar longitudinally in the middle or weakest part of the V-shaped groove or crease therein. (See Figs. 5 and 6.) This ripping-saw 38 is carried by an arbor or shaft 39, which is journaled in bearings 40, fixed to the frame 34, and said arbor 39 has a fast and loose pulley 41 for a belt to positively rotate the saw at a high rate of speed.

To properly guide and support the bar of metal on its way from the creasing-rolls to the saw 38, and from the latter to the receptacle or box 4, I have provided two horizontal fixed guides 42 and 43. The guide 42 is in the form of a funnel or cone, with its reduced open end fixed to one end of the open receptacle 4, and with its enlarged or flared open end in proximity to the saw 38, so as to receive the bar 37 as it passes from the saw 38 and properly guide or direct the same into the receptacle or box 4.

The fixed guide 43 consists of a horizontal bar, which is arranged with its front end close to the set of rolls and with its rear end entering the open enlarged mouth of the guide 42. This forward guide has a longitudinal continuous passage 44, which extends from end to end thereof, through which the bar of metal 37 passes, and this guide is slotted vertically, as at 45, so as to straddle the saw and assume a horizontal position in line with the set of rolls to adapt it to receive the bar. This forward horizontal guide 43 is supported and sustained by a horizontal arm 46, which is firmly secured to the guide and to the frame 34 of the set of creasing-rolls. (See Fig. 5.)

The upper V-shaped roll 32 is removably secured to its arbor 33 by means of a set-screw 47, so that it can be readily taken off and replaced by or interchanged for another one of a set or series of different-sized rolls 48, two of which are represented in detail in Fig. 2 of the drawings. By thus making the creasing-roll of the set interchangeable with other rolls of like construction, but of different sizes, I am enabled to adapt the rolls to properly crease or groove bars of different thicknesses.

In Figs. 7 and 8 of the drawings I have illustrated a modified form of creasing-rolls contemplated by my invention. In this instance I also make the lower roll smooth and plain, and I provide the upper roll with a series of V-shaped circumferential ribs 48, which are gradually reduced in diameter from one end of the roll to the other, and by means of these series of ribs I am enabled to crease or groove bars of different thicknesses without taking off one roll and substituting another of a larger or smaller size.

The rotatable rip-saw 38 is located at a point in rear and at the middle of the rolls, and the conical or funnel shaped guide 42 is arranged between the saw and the receptacle or box, as in my preferred construction hereinbefore described.

The operation of my machine for cutting horseshoe-blanks is as follows: The bar of iron after it emerges from the last pass in the ordinary rolling-mill, and while it is still hot, is inserted between and passed through the set of coacting creasing or grooving rolls, the upper V-shaped roll of which forms a longitudinal V-shaped groove or crease in the upper side of the middle of said bar. The bar passes from the rolls to the guide 43, and it is split or severed longitudinally along the center of the groove or crease at the weakest or thinnest part of said bar by the rapidly-rotating rip-saw 38, which operates in the guide. The split or divided bar next enters the conical guide, which properly directs the bar into the longitudinal receptacle or box 4. The movable or reciprocating bottom 6 is at rest or stationary while the bar enters the receptacle or box, so as to support or uphold the bar therein, and after said bar is properly located in the box the bottom 6 is withdrawn laterally from beneath the receptacle to permit the bar to drop or fall by gravity through the open lower side of the receptacle, and rest upon the horizontal supports in close juxtaposition to the crosscut-saws, this lateral movement of the bottom being effected by depressing the treadle to throw the clutch-sections into engagement, and thus transmit motion from the saw arbor or shaft to the eccentric-shaft. At the first half-revolution of the eccentric-shaft the movable bottom 6 is withdrawn from the receptacle, as described, and during the last half-revolution of this shaft the eccentrics force the movable back to its normal position beneath the receptacle to again close the open lower side thereof. During the retrograde movement of the laterally-movable bottom the longitudinal rib or flange 8 thereof forces the split bar laterally on the supports 10, and moves the same toward the free end of the supports and against the crosscut-saws 15, which cut the bar into blanks of suitable lengths, after which said blanks drop or fall from the supports into a suitable receptacle (not shown) placed beneath the supports.

It will be noted that the proper feeding of the split bar of metal to the crosscut-saws is performed by the rib 8 of the laterally-movable bottom 6 during the retrograde movement of said bottom beneath the receptacle, and that the movement of the bottom when the latter is properly adjusted beneath the receptacle is instantly arrested by releasing the treadle, which instantly uncouples the clutch, and thus stops the section of the counter-shaft in gear with the eccentric shaft. The parts are now in position for the reception of the next bar of metal, and the operation above described can be repeated.

When it is desired to vary the length of the horseshoe-blanks, it is only necessary to adjust or move the crosscut-saws 15 and the corresponding supports 10 on the saw-arbor 16 and rigid bar 12, so as to vary the distance or space intervening between the saws and supports, as is obvious.

I would have it understood that I do not confine myself to making the machine of any given length, or of providing it with any specific number of crosscut-saws, as I am well aware that the proportions of the machine and the number of saws, as well as changes in the details of construction, can be made without departing from the spirit or sacrificing the advantages of my invention.

It is obvious that my machine can be used for cross-cutting a bar of metal into suitable lengths without first creasing or grooving and splitting the bar longitudinally, the bar being placed or adjusted in the longitudinal box or receptacle, and then fed to the crosscut-saws by reciprocating the bottom 6 laterally to permit said bar to fall onto the supports and then feed the bar to the saws.

By the use of the rip and crosscut saws arranged and operating in the manner described I am enabled to rapidly and economically divide a bar of metal longitudinally and cut it up into a series of blanks of suitable length, and these blanks have smooth straight side edges and square smooth ends, instead of the rough and uneven edges and ends which are incident to blanks made by manual labor, as heretofore.

Having thus fully described my invention, what I claim as new, and desire to secure by Letters Patent, is—

1. In a horseshoe-blank-cutting machine, the combination of a set of coacting creasing-rolls and a single rotatable saw arranged at right angles to the axes of the rolls, and at one side thereof, to sever a bar of metal longitudinally as it emerges from said rolls, as set forth.

2. In a horseshoe-blank-cutting machine, the combination of a set of coacting creasing-rolls, one having a V-shaped periphery and a single vertical rotatable saw arranged in rear of said rolls at right angles to the axes of the rolls in the path of the bar of metal as it emerges from the latter to sever or divide said bar longitudinally in the middle of the crease formed by the rolls, substantially as described.

3. In a horseshoe-blank-cutting machine, the combination of a set of coacting creasing-rolls, one having a V-shaped periphery, and a single vertical rotatable saw arranged at one side of said rolls at right angles to the axes thereof and in the vertical plane of the apex of the periphery of the V-shaped roll, substantially as and for the purpose described.

4. In a horseshoe-blank-cutting machine, the combination of a set of creasing-rolls, a single rotatable saw arranged at one side of said rolls and at right angles to the axes thereof, and a fixed guide intermediate of the rolls and saw, with one end terminating in close proximity to the pass of the rolls, and having a longitudinal passage therein through which the bar of metal passes as it emerges from the rolls, substantially as and for the purpose described.

5. In a horseshoe-blank-cutting machine, the combination of a set of creasing-rolls, a horizontal fixed guide located at one side of said rolls and having a longitudinal passage extending therethrough and a vertical slot, and a rotatable vertical saw operating in the slot of said guide, substantially as and for the purpose described.

6. In a horseshoe-blank-cutting machine, the combination of a longitudinal receptacle or box having a movable bottom, a fixed support arranged below said receptacle to receive the bar of metal therefrom, a crosscut rotatable saw arranged to cut said bar of metal transversely as it rests on said support, and mechanism for reciprocating said bottom of the receptacle laterally, substantially as and for the purpose described.

7. In a horseshoe-blank-cutting machine, the combination of a horizontal receptacle or box having a movable bottom, a series of fixed horizontal supports arranged transversely across the receptacle beneath the same to receive the bar of metal therefrom when the bottom is withdrawn from the receptacle, a series of rotatable crosscut-saws arranged in relation to said supports to cut the bar of metal transversely as it rests on the supports, and mechanism for reciprocating said bottom of the receptacle laterally, substantially as and for the purpose described.

8. In a horseshoe-blank-cutting machine, the combination of a longitudinal box or receptacle having an open lower side, a laterally-reciprocating bottom arranged to move beneath said receptacle to alternately open and close the latter throughout its entire length, a series of horizontal supports below said movable bottom, a series of crosscut-saws located in relation to said supports to cut the bar of metal transversely when it rests on said supports, and mechanism for reciprocating said bottom of the receptacle laterally, substantially as and for the purpose described.

9. In a horseshoe-blank-cutting machine, the combination of a longitudinal receptacle or box having an open lower side, a laterally-reciprocating bottom arranged to close and open the lower side of the receptacle, a series of horizontal fixed supports below the receptacle, a series of rotatable crosscut-saws arranged in line with the supports, and means, movable with said reciprocating bottom, for forcing the bar of metal laterally on the supports toward the saws, substantially as and for the purpose described.

10. In a horseshoe-blank-cutting machine, the combination of a longitudinal receptacle or box, a series of fixed horizontal supports arranged transversely below said receptacle, a laterally-reciprocating bottom arranged to close and open the receptacle and having the depending flanges or ribs, which ride on said supports, and a series of rotatable crosscut-saws arranged in line with the supports, substantially as and for the purpose described.

11. In a horseshoe-blank-cutting machine the combination of a longitudinal receptacle or box, a laterally-reciprocating bottom arranged close to the bottom of the receptacle to alternately open and close the same, a series of horizontal supports located transversely below the receptacle and adjustably fixed at one end to a rigid supporting-bar, and a series of rotatable crosscut-saws adjustably fixed to a common shaft or arbor to be movable lengthwise thereon, substantially as and for the purpose described.

12. In a horseshoe-blank-cutting machine, the combination of a longitudinal receptacle or box, a laterally-reciprocating bottom having a depending flange, a series of transverse supports fixed at one end and having a longitudinal open slot in its other end, and a series of rotatable crosscut-saws arranged to enter the slots in the free ends of said supports, substantially as and for the purpose described.

13. In a horseshoe-blank-cutting machine, the combination of a longitudinal receptacle or box, a laterally-reciprocating bottom arranged close to the lower side thereof, a series of horizontal fixed supports, a longitudinal saw-arbor carrying a series of rotatable crosscut-saws, an eccentric shaft connected by pitmen with said reciprocating bottom, and a counter-shaft geared to the saw-arbor and eccentric-shaft, substantially as and for the purpose described.

14. In a horseshoe-blank-cutting machine, the combination of a suspended longitudinal receptacle or box, a laterally-movable bottom, a series of horizontal supports arranged transversely below said receptacle, a longitudinal saw-arbor carrying a series of rotatable crosscut-saws, an eccentric-shaft having its eccentric-straps connected by intermediate pitmen with the reciprocating bottom, a sectional counter-shaft geared to the saw-arbor and eccentric-shaft, and a clutch controlled by a treadle for coupling said sectional counter-shaft, substantially as and for the purpose described.

15. In a horseshoe-blank-cutting machine, the combination of a set of coacting creasing-rolls, a longitudinal receptacle or box arranged in line with said rolls to receive the bar of metal therefrom, a rotatable rip-saw intermediate of said receptacle and the creasing-rolls for dividing said bar of metal longitudinally, and a series of rotatable crosscut-saws for cutting the bar of metal transversely into suitable lengths before said bar is discharged from the machine, substantially as described, for the purpose set forth.

16. In a horseshoe-blank-cutting machine, the combination of a set of coacting creasing-rolls, a longitudinal receptacle arranged at one side thereof to receive the bar of metal after it passes through the rolls, a rip-saw intermediate of said receptacle and the rolls, and a guide between the saw and receptacle for directing the bar of metal into the receptacle after it is split or divided longitudinally by the rip-saw, substantially as and for the purpose described.

17. In a horseshoe-blank-cutting machine, the combination of a set of creasing-rolls for forming a longitudinal crease or groove in a bar of metal, a vertical rotatable rip-saw for dividing said metal bar longitudinally along the middle of the crease therein, and a series of rotatable crosscut-saws rotating in a plane at right angles to the rip-saw for cutting said metal bar transversely into suitable lengths, substantially as and for the purpose described.

18. In a horseshoe-blank-cutting machine, the combination of a set of coacting creasing-rolls, an open receptacle or box arranged in line with said rolls for receiving the metal bar as it emerges therefrom, a vertical rip-saw between the rolls and receptacle, an open-ended conical guide fixed to the receiving end of said receptacle and terminating close to the saw, and a series of rotatable crosscut-saws for cutting the metal bar transversely after it leaves the receptacle, substantially as and for the purpose described.

19. In a horseshoe-blank-cutting machine, the combination of a set of coacting creasing-rolls, a horizontal fixed guide arranged close up to said rolls and having a longitudinal passage and a vertical slot, a vertical rip-saw operating in said slot of the guide, a longitudinal receptacle or box in rear of and in line with said guide, an open-ended conical guide intermediate of the rip-saw and receptacle to receive the metal bar from the horizontal guide and direct the same into the receptacle, and a series of rotatable crosscut-saws for cutting the metal bar transversely before it leaves the machine, substantially as described.

20. In a horseshoe-blank-cutting machine, a pair of coacting creasing-rolls, substantially as described, one of said rolls having an integral inverted-V-shaped periphery and the other roll having a smooth plain periphery, and means for detachably clamping the V-shaped roll to its arbor, as and for the purpose set forth.

In testimony whereof I affix my signature in presence of two witnesses.

EDWIN FIRTH.

Witnesses:
 JOS. FORREST,
 H. T. BERNHARD.